United States Patent
Alvarez Berenguer et al.

(10) Patent No.: US 6,824,606 B1
(45) Date of Patent: Nov. 30, 2004

(54) ADDITIVE FOR SPECIAL PLASTERS AND MORTARS, COMPOSITIONS CONTAINING THE ADDITIVE AND UTILIZATION OF THE ADDITIVE IN SPECIAL PLASTERS AND MORTARS

(75) Inventors: Antonio Alvarez Berenguer, Madrid (ES); Francisco Javier Limpo Orozco, Madrid (ES); Bernardo Enrique Del Valle Álvarez, Madrid (ES); Manuel Hidalgo Martín, Madrid (ES)

(73) Assignee: Tolsa, S.A., Madrid (ES)

( * ) Notice: Subject to any disclaimer, the term of this patent is extended or adjusted under 35 U.S.C. 154(b) by 0 days.

(21) Appl. No.: 09/700,818

(22) PCT Filed: May 19, 1999

(86) PCT No.: PCT/ES99/00145

§ 371 (c)(1),
(2), (4) Date: Dec. 19, 2000

(87) PCT Pub. No.: WO99/59933

PCT Pub. Date: Nov. 25, 1999

(30) Foreign Application Priority Data

May 20, 1998 (ES) ................................................ 9801042

(51) Int. Cl.⁷ .............................................. C04B 24/10
(52) U.S. Cl. ...................... 106/718; 106/719; 106/730; 106/774; 106/779; 106/803; 106/804; 106/811
(58) Field of Search ................................ 106/718, 719, 106/730, 803, 804, 811, 774, 779, 684, 694

(56) References Cited

U.S. PATENT DOCUMENTS

| | | | | |
|---|---|---|---|---|
| 3,891,453 A | * | 6/1975 | Williams | |
| 4,548,734 A | * | 10/1985 | Chaux et al. | 252/311 |
| 4,826,535 A | * | 5/1989 | Godly | 106/209 |
| 5,049,182 A | * | 9/1991 | Scher et al. | 71/93 |
| 5,164,433 A | * | 11/1992 | Ricci et al. | 524/47 |
| 5,207,830 A | * | 5/1993 | Cowan et al. | 106/672 |
| 5,576,271 A | * | 11/1996 | Patel | 507/110 |
| 5,762,023 A | * | 6/1998 | Carter | 119/173 |
| 5,789,352 A | * | 8/1998 | Carpenter et al. | 507/209 |
| 6,025,303 A | * | 2/2000 | Keilhofer et al. | 507/140 |

FOREIGN PATENT DOCUMENTS

| | | | |
|---|---|---|---|
| CA | 2081830 | * | 5/1993 |
| CN | 1144833 | * | 3/1997 |
| GB | 2329895 | * | 4/1999 |
| JP | 58070799 | * | 4/1983 |
| JP | 60168730 | * | 9/1985 |
| JP | 63165489 | * | 7/1988 |
| JP | 01035176 | * | 2/1989 |
| JP | 09137153 | * | 5/1997 |

OTHER PUBLICATIONS

"Effect of Stabilizing additives on the Stability of Coal–Water Mixtures" Usui et al., J. Chem Eng. Japan (1987), 20(2), p 192–195, 1987.*

Dominguex Bidagor, Jr. et al., *Cemento–Hormigon*, 774:1040–1056 (1997), "Morteros Y Aditivos".

* cited by examiner

*Primary Examiner*—Paul Marcantoni
(74) *Attorney, Agent, or Firm*—Klauber & Jackson

(57) ABSTRACT

A water retaining additive for conglomerate building materials, free of cellulose-like derivatives, that comprises at least a rheological grade clay, preferably sepiolite, and a modified natural gum such as guar gum, as well as conglomerate compositions that contain the additive, as well as the use of the additive for different constructions materials comprised of gypsum and special mortars are described.

10 Claims, No Drawings

ADDITIVE FOR SPECIAL PLASTERS AND MORTARS, COMPOSITIONS CONTAINING THE ADDITIVE AND UTILIZATION OF THE ADDITIVE IN SPECIAL PLASTERS AND MORTARS

TECHNICAL FIELD OF THE INVENTION

The present invention fits in the field of compounds and compositions useful as conglomerate building materials, and more specifically in the sector of water retaining additives for conglomerate building materials such as special mortar and gypsum.

PRIOR ART OF THE INVENTION

In the last few years, filled conglomerate building material compositions are being used more and more in replacement of conglomerate building materials, since they have noteworthy advantages as to their placement conditions, such as workability, initial degree of adherence and water retaining power during kneading, etc., as well as in their final properties, such as for example their qualities of adherence, resistance and finish.

These filled conglomerate building material compositions include additives, additional to the components of traditional conglomerate building materials, that provide the above mentioned advantageous properties.

Within the different types of filled conglomerate building materials, there are some whose final properties require the use of a thickening agent and water retaining agent. Among these materials are special mortar and gypsum that are used in very different applications such as the bonding among enclosures or supports with different ceramic materials, facade coverings, repairing and engobing.

Gypsum and special mortar, such as glue mortar, conventionally comprise a series of additives, such as for example water retaining agents. A water retaining agent is a product that due to its molecular structure and to its surface properties bonds to the water by means of "weak bonds" and retains the water in the matrix of the conglomerates during the setting and hardening process. The rheology in the paste that is formed is improved. The water retaining additives conventionally used for conglomerate building materials such as special mortar and gypsum, are based on cellulose-like derivatives, no alternative thereto being known up until the present.

European patent application EP-A-0773198 describes a thickening system that contains at least a cellulose-like ether, a starch ether, thickening components and a layer silicate such as sepiolite, bentonite and other clay, that correspond to such an additive on the market.

Cellulose-like derivatives provide, based on their thickening effects, greater consistency to conglomerate building materials aside from increasing their water retaining and adherence capacities. Nonetheless, cellulose-like derivatives have the disadvantage of being relatively expensive and therefore conglomerate building materials such as traditional mortar and gypsum, without or with less than the necessary doses of such derivatives, are still being used, despite their poorer qualities with respect to filled compositions, for many uses when the use of a sufficiently filled conglomerate composition would really be more appropriate.

U.S. Pat. No. 5,637,144 describes a substitutive composition of asbestos that comprises water, water retaining agents and finely divided clay, especially bentonite, while U.S. Pat. No. 4,028,127 describes a mixture of cement comprised of gypsum with the product resulted from reacting a guar hydroxyalkyl ether with glyoxal that is useful to cover up cracks and holes in surfaces. None of the compositions described in the above mentioned U.S. patents can be applied as mortar or gypsum.

OBJECT OF THE INVENTION

An object of the present invention is to overcome the inconveniences of conventional gypsum and special mortar, that comprise cellulose-like derivatives, by means of the replacement of such derivatives by a new additive that allows achievement of placement and final qualities at least similar to said conventional filled compositions and in turn allow a reduction of the total cost of the final compositions.

Another object of the invention is to make available a new additive that improves at least one of the placement and final qualities with respect to conventional gypsum and special mortar.

Another object of the invention is to make available a new additive for gypsum, special mortar, such as glue mortar, single layer.

The present invention also has the object of filled compositions comprising special mortar and gypsum that contain the additive as well as the use of the new additive in special mortar and gypsum.

DESCRIPTION OF THE INVENTION

The above defined objects are achieved by means of a new additive for gypsum and special mortar, free of cellulose-like derivatives, whose additive comprises at least a solid mineral component selected from among clay, and at least a modified natural gum, in which the mineral component is a solid mineral component selected from among rheological grade sepiolite, rheological grade attapulgite and mixtures thereof. Preferably, the additive according to the invention comprises 20–75%, and more preferably 35–60%, of the solid mineral component;

25–80%, and more preferably 40–65%, of a modified natural gum.

According to the invention, the solid mineral component is at least a rheological grade clay selected from among attapulgite, sepiolite and mixtures thereof.

The solid mineral component is preferably rheological grade sepiolite such as the one described for example in European patent applications EP-A-0454222 and EP-A-0107299, whose content is included in the present description by reference.

Rheological grade sepiolite, marketed for example by TOLSA, S.A., Madrid, Spain, under the trade mark PANGEL, and obtained from natural sepiolite by means of special micronization processes that substantially prevent breakage of the sepiolite fibers, disperses easily in water and other polar liquids, and has an external surface with a high degree of irregularity, a high specific surface, greater than 300 m2/g and a high density of active centers for adsorption, that provide it a very high water retaining capacity upon being capable of forming, with relative ease, hydrogen bridges with said active centers. The microfibrous nature of the rheological grade sepiolite particles makes sepiolite a material with high porosity and low apparent density. Due to the above mentioned properties, rheological grade sepiolite is capable of forming high viscosity pastes with excellent thixotropic and pseudoplastic behavior. In accordance with the invention, it has been verified that, when rheological grade sepiolite is added, along with a modified natural gum, to conglomerate building materials such as special mortar and gypsum, the adhesiveness, cohesion, surface efficiency, stability and texture of the mortar and gypsum are improved.

Additionally, rheological grade sepiolite has a very low cationic exchange capacity and the interaction with electrolytes is very weak, which in turn causes rheological grade sepiolite not to be practically affected by the presence of salts in the medium in which it is found, and therefore, it remains stable in a broad pH range. This final characteristic proves to be of the utmost importance since the mediums in which they work have a high salt content.

The above mentioned advantages and qualities pointed out with regard to rheological grade sepiolite, can also be attributed to rheological grade attapulgite with particle sizes smaller than 40 micra, such as for example the range of ATTAGEL goods (for example ATTAGEL 40 and ATTA-GEL 50) manufactured and marketed by the firm Engelhard Corporation, United States, and the MIN-U-GEL range of Floridin Company.

The modified natural gum may be selected from among combinations of monosaccharides, glucose, mannose, galactose and/or glucuronic acid, modified by successive reactions of basification and etherification with ethylene oxide and/or propylene oxide and/or butylene oxide. Preferably, the modified natural gum is a galactomanane, in other words, polysaccharides formed exclusively by galactose and mannose and modified by etherification with polypropylene oxide.

These natural gums have a main chain substantially identical to the chemical structure of cellulose, but they differ from cellulose in that they have lateral chains of other monomers. Their most outstanding functional property is that of the rheological agent in aqueous fluids and that of being an effective water retaining agent.

Optionally, the additive according to the present invention may be complemented with other thickening agents such as for example modified starches or polyacrylamides.

The additive according to the present invention, may be prepared by means of mixing its components without any specific order of addition being necessary, for example, for 5 minutes in a V mixer until a homogeneous product is obtained.

In order to add the additive to a conglomerate building material such as for example a special mortar or gypsum, the additive may be mixed together with the aggregate and cement fractions during manufacturing in the case of special mortar or, in the case of gypsum, during the manufacturing of the gypsum. Likewise, the additive according to the present invention may also be added in situ during the mixing with the kneading water.

Inclusion of the additive of the present invention in conglomerate building materials, such as special mortar and gypsum, implies the following characteristics:

Great water retaining capacity that allows the conglomerate building materials to have good properties in a fresh state and in a hardened state.

Absence of segregation and exudation, based on the viscosity regulating and thixotropic qualities of the additive that contribute to the homogeneity of the composition of conglomerate materials.

Workability based on an increase of the thixotropic nature provided to the conglomerate material by the additive, which permits a labor cost reduction in order to achieve a satisfactory final finish.

Increase of covering capacity per unit of mass of the conglomerate material upon improving its thixotropy and plasticity.

Possibility to obtain excellent final finishes with very smooth surface textures, upon the additive providing a soft and plastic consistency.

Great adherence in the fresh state as well as in the hardened state.

The possibility of doing without cellulose-like derivatives in order to achieve the above mentioned qualities in conglomerate materials makes it possible to obtain a reduction of the cost of conglomerate material with regard to conglomerate materials that comprise cellulose-like derivatives.

EMBODIMENTS OF THE INVENTION

The present invention is additionally illustrated on the basis of the following embodiments.

EXAMPLE 1

A 50 kg sample of the additive was prepared according to the invention by mixing in a V mixer for 5 minutes the following components:

24 kg of rheological grade sepiolite of TOLSA, S.A. Madrid (Spain)

26 kg of hydroxypropyl guar obtaining a homogenous product.

EXAMPLE 2

Two samples of mortar, one with a commercial cellulose-like derivative (TYLOSE 10004 MH of HOECHST AG) as an additive, and the other one with the additive according to the present invention prepared in accordance with example 1, were prepared. For this purpose, Portland cement, thick aggregates with a particle size smaller than 1 mm, fine aggregates with a particle size smaller than 0.55 mm, and respectively one of the above mentioned additives were mixed for 5 minutes and each one of the samples were kneaded until glue mortar of the characteristics specified in the following table were obtained:

TABLE 1

| Sample | Portland Cement IIB-45A (p.p.) | Coarse sand (p.p.) | Fine sand (p.p.) | Water (p.p.) | Cellulose-like derivative (p.p.) | Additive of invention (p.p.) |
|---|---|---|---|---|---|---|
| I | 310 | 560 | 130 | 250 | 3 | 0 |
| II | 310 | 560 | 130 | 250 | 0 | 6.3 |

The cost of adding the additive per ton of glue mortar, was approximately 3,220 ptas./t for sample I, that is to say, for the conventional additive, and 2,250 ptas./t for sample II, that is to say, for the additive according to the present invention.

The properties of the glue mortar according to samples I and II were evaluated according to European standards for adhesives for ceramic tiles. The water retention, consistency, vertical slipping, adherence 28 days later and workability were tested after 20 minutes and 28 days after the glue mortar were prepared. The results are shown in the following table:

TABLE 2

| Sample | Water retention (%) | Consistency (mm) | Vertical slipping (mm) | Adherence 28 days (kg/cm2) | Workability after 20 min. & 28 days (kg/cm2) |
|---|---|---|---|---|---|
| I | 99.93 | 180 | 0 | 11 | 9.1 |
| II | 99.94 | 180 | 0 | 11.1 | 9.0 |

The results show that the additive object of the present invention (sample II) provides at least the same properties as the conventional additive comprised of cellulose-like derivatives, but at a substantially lower cost.

EXAMPLE 3

Two samples of glue mortar, one with a commercial cellulose-like derivative (METHOCEL HB of DOW CHEMICAL) as an additive, and the other one with the additive according to the present invention prepared in accordance with example 1 were prepared. For this purpose, Portland cement, coarse aggregates with a particle size smaller than 1 mm, fine aggregates with a particle size smaller than 0.5 mm, and respectively one of the above mentioned additives, were mixed for 5 minutes, and each one of the samples were kneaded until glue mortar with that characteristics that are specified in the following table were obtained:

TABLE 3

| Sample | Portland Cement IIB-45A (p.p.) | Coarse sand (p.p.) | Fine sand (p.p.) | Water (p.p.) | Cellulose-like derivative (p.p.) | Additive of invention (p.p.) |
| --- | --- | --- | --- | --- | --- | --- |
| III | 200 | 600 | 200 | 250 | 2.5 | 0 |
| IV | 200 | 600 | 200 | 250 | 0 | 5.25 |

The cost of adding the additive per ton of glue mortar, was approximately 2,875 ptas./t for sample III, that is to say, for the conventional additive, and 2,200 ptas/t for sample IV, that is to say, for the additive according to the present invention.

The properties of the glue mortar according to samples III and IV were evaluated according to European standards for adhesives for ceramic tiles. The water retention, consistency, vertical slipping, adherence 28 days later and workability were tested after 20 minutes and 28 days after the glue mortar were prepared. The results are shown in the following table:

TABLE 4

| Sample | Water retention (%) | Consistency (mm) | Vertical slipping (mm) | Adherence 28 days (kg/cm2) | Workability after 20 min. & 28 days (kg/cm2) |
| --- | --- | --- | --- | --- | --- |
| III | 99.93 | 180 | 0 | 12.2 | 10.0 |
| IV | 99.94 | 180 | 0 | 12.0 | 10.3 |

The results show that the additive object of the present invention (sample IV) provides at least the same properties as the conventional additive comprised of cellulose-like derivatives, but at a substantially lower cost.

What is claimed is:

1. An additive for conglomerate building materials, selected from the group consisting of gypsum and mortar, that comprises a solid mineral component comprised of clay, and at least a modified natural gum the additive being free of cellulose derivatives, wherein the solid mineral component is a rheological grade sepiolite.

2. An additive according to claim 1 comprising

20–75% by weight of the solid mineral component;

25–80% by weight of the modified natural gum.

3. An additive according to claim 1 comprising:

35–60% by weight of the solid mineral component;

40–65% by weight of the modified natural gum.

4. An additive according to claim 1, wherein the modified natural gum is at least one combination of at least two monosaccharides, glucose, mannose, galactose, and glucuronic acid, modified by etherification.

5. An additive according to claim 4, wherein the combination of monosaccharides is etherified with an alkylene oxide selected from ethylene oxide, propylene oxide and butylene oxide.

6. An additive according to claim 4, wherein the combination of monosaccharides is a galactomanane.

7. An additive according to claim 1, wherein the modified natural gum is modified guar gum.

8. A filled composition of conglomerate building materials comprising a fraction selected from the group consisting of a cement, gypsum, and an aggregate, and 0.05–1.2% weight of the additive according to claim 1.

9. A filled composition according to claim 8 comprising 0.2%–0.9% by weight of the additive.

10. A method of using the additive of claim 1 as a component in a mortar, the method comprising adding the additive to the mortar.

* * * * *